March 30, 1937.  E. L. BOWMAN  2,075,266
DISINFECTING DISPENSING APPARATUS
Filed Jan. 16, 1934   2 Sheets-Sheet 2
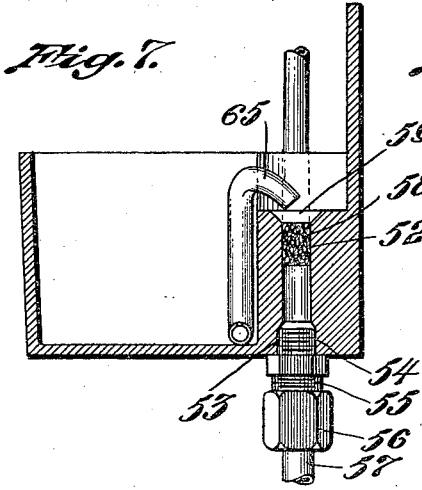
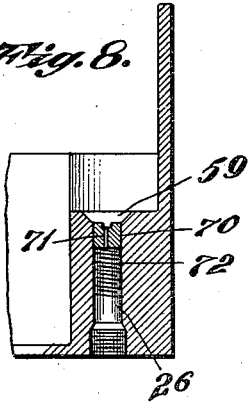
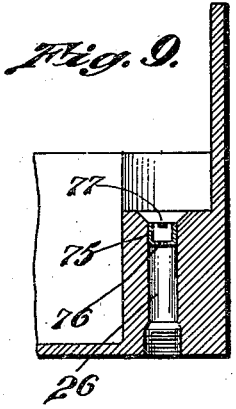
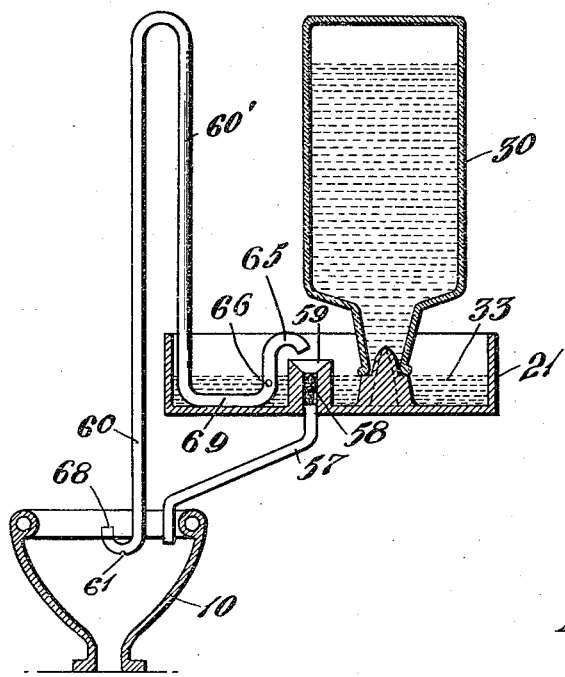
INVENTOR.
Earle L. Bowman
BY Barlow & Barlow
ATTORNEYS.

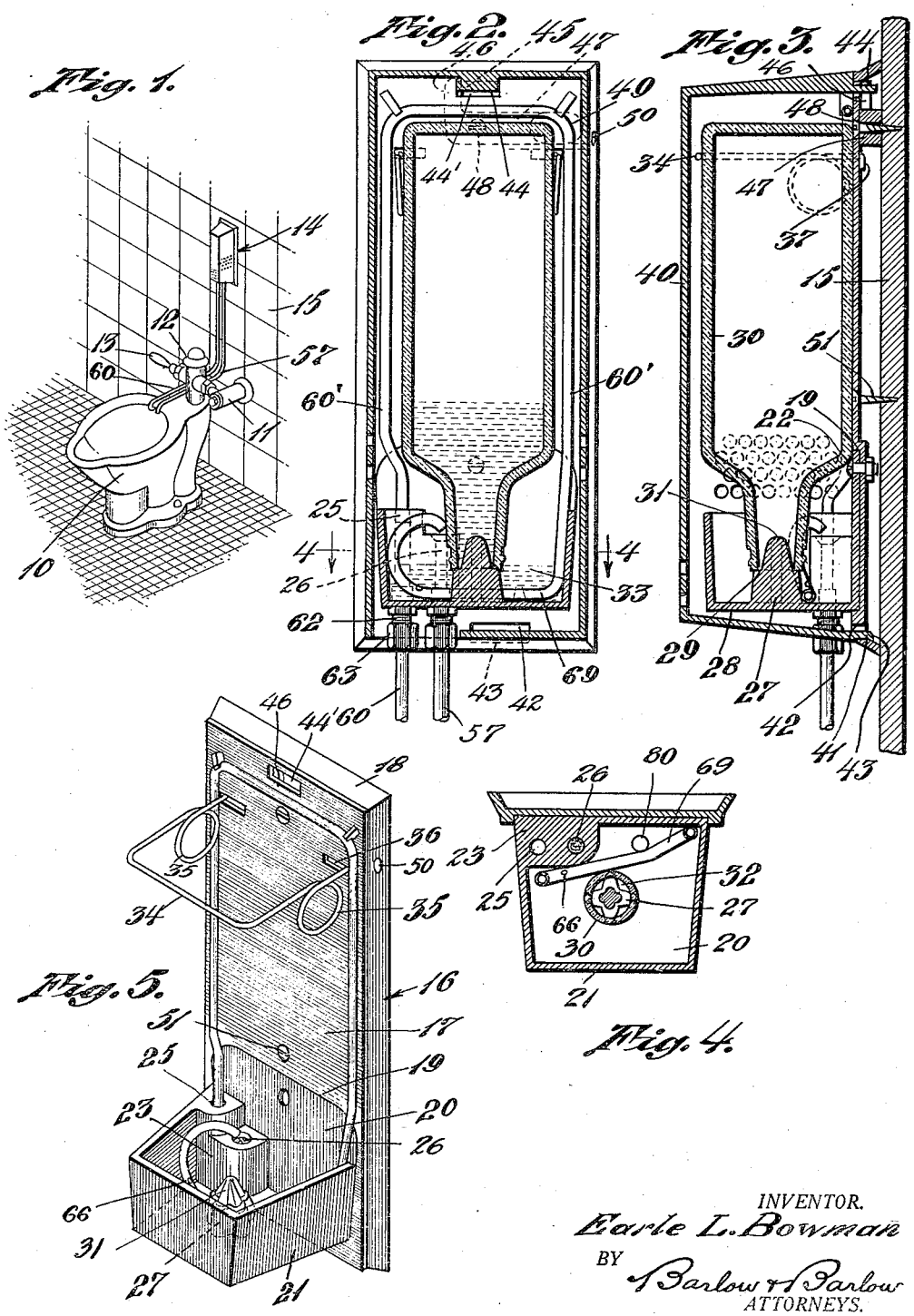

Patented Mar. 30, 1937

2,075,266

UNITED STATES PATENT OFFICE 2,075,266

DISINFECTING DISPENSING APPARATUS

Earle L. Bowman, Attleboro, Mass.

Application January 16, 1934, Serial No. 706,846

9 Claims. (Cl. 4—224)

This invention relates to an apparatus for dispensing a disinfecting liquid; and has for one of its objects the provision of such an apparatus which may be controlled in its dispensing of the liquid by the flushing of a water closet.

Another object of the invention is the provision of a disinfecting apparatus which is so arranged that it gradually dispenses a disinfecting liquid after being actuated by the flushing of a water closet.

Another object of the invention is the provision of a dispensing device which may be adjusted to dispense varying amounts of liquid upon each actuation of the water closet and to dispense the liquid in a varying manner with respect to time.

A further object of the invention is the provision of an apparatus which altho connected to dispense the disinfecting liquid into the bowl of a lavatory, will also permit evaporation of some of its liquid into the surrounding air in the room in which it is located irrespective of actuation for discharging its liquid into the lavatory.

A still further object of the invention is the provision of an apparatus so arranged that there can be no intercommunication between the flow of water which actuates the device and the deodorant or disinfecting liquid which is used for disinfecting purposes.

With these and other objects in view, the invention consists of certain novel features of construction, as will be more fully described, and particularly pointed out in the appended claims.

In the accompanying drawings:

Fig. 1 is a perspective view of a water closet equipped with my disinfecting apparatus.

Fig. 2 is a central sectional view of the apparatus looking towards the wall as shown in Fig. 1, upon which the device is mounted.

Fig. 3 is a central sectional view at right angles to the section of Fig. 2.

Fig. 4 is a sectional view on line 4—4 of Fig. 2.

Fig. 5 is a perspective view of the device with the cover and supply bottle removed.

Fig. 6 is a diagrammatic view illustrating more clearly the operation of the apparatus.

Fig. 7 is a sectional view thru the reservoir and the chamber for controlling the discharge.

Figures 8 and 9 are views similar to Fig. 7 showing fragmentary portions of the reservoir and modified forms of the discharge chambers.

In public toilets where water closets are present, it is desirable to dispense some disinfecting liquid, both into the bowl of the water closet and also into the surrounding air of the room in which the water closet is located; and in order that this may be done in a practical manner and the disinfecting material dispensed into the water closet in proportion to the use of the water closet, I have arranged to provide for dispensing a certain quantity of my disinfecting liquid each time the water closet is flushed, whereby I am enabled to cause a container or supply bottle of disinfecting liquid to serve the useful purpose desired and yet use a considerably less quantity than where a container is used which causes continual dropping of the disinfecting liquid; and the following is a more detailed description of the present embodiment of this invention illustrating the preferred means by which these advantageous results may be accomplished:

With reference to the drawings, 10 designates a water closet which is supplied with water thru a conduit 11 controlled by a valve 12 operated by a handle 13. My disinfecting apparatus is designated generally 14 and is mounted upon a wall 15 adjacent the water closet 10.

This disinfecting apparatus in one practical embodiment consists of a base 16 comprising a plate 17 with edge flanges 18 to space it from the wall on which it is mounted. This plate is usually of a cast or pressed construction and recessed at 19 for the reception of a wall 20 of the reservoir 21 which is secured in the recess 19 by a bolt 22 extending thru registering openings in the wall 20 of the reservoir and the plate 17. The wall 20 is of an irregular shape which fits the recess and thus cannot swing about the bolt 22 as a pivot.

The reservoir 21 is of cast or pressed construction and is provided in one corner with a block 23 provided with bores 25 and 26. There is also a pedestal 27 cast on the bottom wall 28 of the reservoir 21, which pedestal has a supporting shoulder 29 for the edge of the neck of a supply bottle or container 30 which is inverted with its edge resting upon the supporting surface 29 of the pedestal 27, while there extends into the neck of the bottle a projection 31 serving as a guide and positioning member and cut away as at 32 in several different locations about its circumference for the discharge of the disinfecting liquid which the supply bottle contains. This liquid will flow from the bottle when positioned in inverted position on the pedestal 27 and fill the reservoir, as illustrated in Fig. 2 at 33, until a level is reached, substantially the level of the supporting surface 29 when the opening from the bottle will be sealed in by its own liquid discharge and as no further air can enter the atmospheric pressure will prevent further discharge of the disinfecting liquid. This is referred to as a fountain feed in connection with this application.

The upper end of the bottle 30 is maintained in desired position by a spring clamp 34 which consists of a length of wire embracing the front of the bottle and extending along either side with a spring loop 35 in either side and thence thru slots 36 in the base to be turned at right angles as at 37, to maintain the spring clamp 34 in its desired position. By reason of the looseness or fit of the clamp and its spring coils on the side, I may lift the clamp over the upper end of the bottle for removing the bottle from position and replacing a fresh one.

In order that the apparatus which I have described may be inclosed, I provide a cover 40 which has a tongue 41 to extend thru a slot 42 in the base where it is turned as at 43 to retain it against movement at right angles to the base. On the upper end of this cover is provided a tongue 44 to extend thru a slot 44' in the base and which tongue is notched as at 45 to receive a finger 46 provided on one end of the lever 47 which is pivoted as at 48 and moved into locking position by the opposite weighted end 49. An opening 50 is provided in the side wall of the base 16 adjacent to the weighted end of the lever 47 thru which opening a pin or the like may be inserted to engage and move the weighted end upwardly, thereby moving the finger 46 of the opposite end downwardly and out of engagement with the notch in the tongue 44 which unlocks and permits the cover to be removed. The base is secured to the wall 15 by means of the screw 48 which also serves as a pivot for the lever 47 and by means of the additional screws 51. The opening 50 in the base provides access to the pivoted lever when the base is in secured position on the wall.

In the bore 52, I have provided a threaded sleeve 53 to engage similar threads 54, while the outer end of the sleeve is threaded as at 55 to receive the union 56 connecting it to the conduit 57 which will lead the discharged disinfecting liquid to the bowl of the water closet 10. At the upper end of the bore 52, I have provided a packing material 58 which is of such density as to permit the liquid disinfectant to slowly seep therethrough and trickle down the pipe as desired. This packing material serves as a porous bottom wall for the chamber 59 above it which may be enlarged by a flaring of the bore 52.

From the bore 52, there extends a conduit 60 to a point in the bowl of the water closet with its open end in a position so that when the closet is flushed water will flow into the conduit 60 and rise in the tube a substantial extent depending on the force thereof altho after this first flushing occurs the water may drain from this pipe thru an opening 61. The conduit 60 is connected to the bore 25 by a thread sleeve 62 and a union 63 in the same manner as is the conduit 57 connected to its bore as above described.

From the upper end of bore 25 the conduit 60 now designated 60', is continued to a height greater than the height of the supply bottle and for practical purposes is bent around the bottle to practically frame the same. This tube then passes into and across the bottom of the reservoir 21 with its end 65 positioned to discharge into the chamber 69, the portion of the tube 60' which extends thru the liquid in the reservoir is perforated as at 66 so that it will fill with the disinfecting liquid altho this opening 66 is of such a size that the liquid cannot quickly escape therethrough when air pressure is exerted thru tube 60 and 60' on the surface of the liquid therein. A small protuberance 80 is provided on the bottom wall 28 of the reservoir 21 to aid in maintaining the tube 69 in proper position.

If we refer to the schematic view of Fig. 6, we can readily observe that the operation of the device will be as follows:

Assume that the supply bottle 30 is provided with a reservoir 21 filled with liquid 33 to a level substantially as indicated in Fig. 6, the level of the liquid will be below the level of the upper edge of the chamber 59. The portion 69 of the tube 60' will have a disinfecting liquid in it also substantially to the level of the liquid in the reservoir or this liquid may be slightly higher due to capillary attraction of the liquid being confined in the smaller tube 60'. Should the water closet 10 be now flushed, water will enter the open end 68 of the tube 60 with considerable force and with sufficient force to force the liquid up the tube 60 to a substantial extent and thus force the air in the tube to apply pressure upon the liquid in the U-shaped portion 69 of the tube 60' which is located in the liquid 33. The hole 61 is of such small capacity that its action may be more or less of an orifice opening and the water cannot be forced out fast enough but that the water will be forced up the pipe 60'. The compression of the air will in turn force the liquid in portion 69 of the tube 60' out into the chamber 59 to fill the chamber and allow any excess to overflow back into the reservoir and join with the liquid 33 therein. A slight amount of the liquid will be forced through the opening 66 which is desirable as the opening 66 is in this way self cleaning. The liquid in the chamber 59 after being filled will start to escape through the packing 58 slowly and trickle down the tube 57, the speed of which will be governed by the character of the packing at 50 and the angle of the conduit 57 which may be adjusted to acquire the desired feed of the disinfectant to the water closet bowl.

In some instances, it may be desired to provide a different form of bottom wall than the packing 50 and for this purpose I have provided a plug 70 with a small opening 71 therein, which plug is positioned in the threaded end 72 of the bore 26 and by adjusting the depth to which the plug 70 is screwed the capacity of the chamber 59 may be regulated and by using plugs of various openings 71 the rate of flow may be regulated.

In other instances as I have illustrated in Fig. 9, a cup 75 which may be frictionally placed in the bore 26 and provided with an opening 76 in its bottom wall while there is a bar 77 extending across its mouth for engagement to position it to different depths in the bore 26 for varying the capacity of chamber 59, while I may use cups of different bores for varying the rate of flow of the disinfecting liquid.

By this arrangement a very compact controlled dispensing disinfecting apparatus is provided which may be readily attached and the disinfecting liquid replenished as desired.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a liquid dispensing apparatus, a liquid containing reservoir, a chamber above said reservoir, a discharge conduit from said chamber, and means responsive to the flushing of water in an apparatus having a water flushing arrangement for depositing some of said liquid in said chamber, said chamber also being open to the air in a considerable area to permit evaporation thereof.

2. In a liquid dispensing apparatus, a liquid containing reservoir, a chamber above said reservoir, a discharge conduit from said chamber, a conduit of substantially equal cross-sectional area extending into said reservoir and directed towards said chamber, said conduit confining a portion of the liquid from said reservoir therein, and means responsive to the flushing of water in an apparatus having a water flushing arrangement for compressing air in said conduit for forcing some of the confined liquid therein into said chamber.

3. In a liquid dispensing apparatus, a liquid containing reservoir, a chamber above said reservoir, a discharge conduit from said chamber, a conduit of substantially equal cross-sectional area extending into said reservoir and directed towards said chamber, said conduit continuing to a water flushing apparatus and so arranged that the flushing water enters said conduit to compress the air therein for forcing some of the confined liquid therein into said chamber.

4. In a liquid dispensing apparatus, a liquid containing reservoir, a chamber above said reservoir, a discharge conduit from said chamber, a conduit in said reservoir confining a part of the liquid in said reservoir and directed towards said chamber, said conduit continuing to a water flushing apparatus and so arranged that the flushing water thereof enters said conduit to compress the air therein for forcing some of the confined liquid therein into said chamber, said conduit extending to a sufficient height to prevent the water from discharging into said liquid or said liquid from being syphoned into said water.

5. In a liquid dispensing apparatus, a liquid containing reservoir, a chamber above said reservoir, a discharge conduit from said chamber, a conduit of substantially equal cross sectional area extending into said reservoir, and directed towards said chamber, said conduit confining a portion of the liquid from said reservoir therein, said conduit continuing to a water flushing apparatus and so arranged that the flushing water thereof enters said conduit to compress the air therein for forcing some of the confined liquid therein into said chamber, and means for additional liquid in said reservoir to enter the confined area to replace that discharged into said chamber.

6. In a liquid dispensing apparatus, a liquid containing reservoir, a chamber above said reservoir, a discharge conduit from said chamber, a conduit of substantially equal cross-sectional area extending into said reservoir and directed towards said chamber, said conduit confining a portion of the liquid from said reservoir therein, means responsive to the flushing of water in an apparatus having a water flushing arrangement for compressing the air in said tube for forcing some of the liquid in said conduit into said chamber, and means for draining the flushing water from said conduit.

7. In a liquid dispensing apparatus, a liquid containing reservoir, liquid supply means for maintaining said liquid at a constant level in said reservoir, a chamber above said reservoir, a discharge conduit from said chamber, a conduit in said reservoir confining a part of the liquid in said reservoir and directed towards said chamber, said conduit continuing to a water flushing apparatus at a lower level and so arranged that the flushing water thereof enters said conduit to compress the air therein for forcing some of the confined liquid therein into said chamber, said conduit extending to a height greater than said liquid supply means.

8. In a disinfecting apparatus, a liquid reservoir, a supply tank connected to said reservoir by a fountain feed for maintaining liquid at a definite level in said reservoir, a chamber having a discharge conduit, a pressure tube having a portion in said reservoir and having an opening intermediate its ends for communication with said reservoir for slow feed between them and positioned to discharge liquid therein into said chamber, and means for forcing the liquid in said tube into said chamber, said chamber having an adjustable slow discharge bottom whereby the size of the chamber may be regulated.

9. In combination, an apparatus having a bowl with a water flushing arrangement for said bowl, a liquid dispensing apparatus comprising means actuated by the flushing of water in said bowl for segregating a definite quantity of liquid in the dispensing apparatus for discharge, and means for controlling the discharge of said segregated liquid to deposit it into the said bowl after said flushing occurs and continuing for a substantial length of time thereafter without further flushing.

EARLE L. BOWMAN.